200# UNITED STATES PATENT OFFICE.

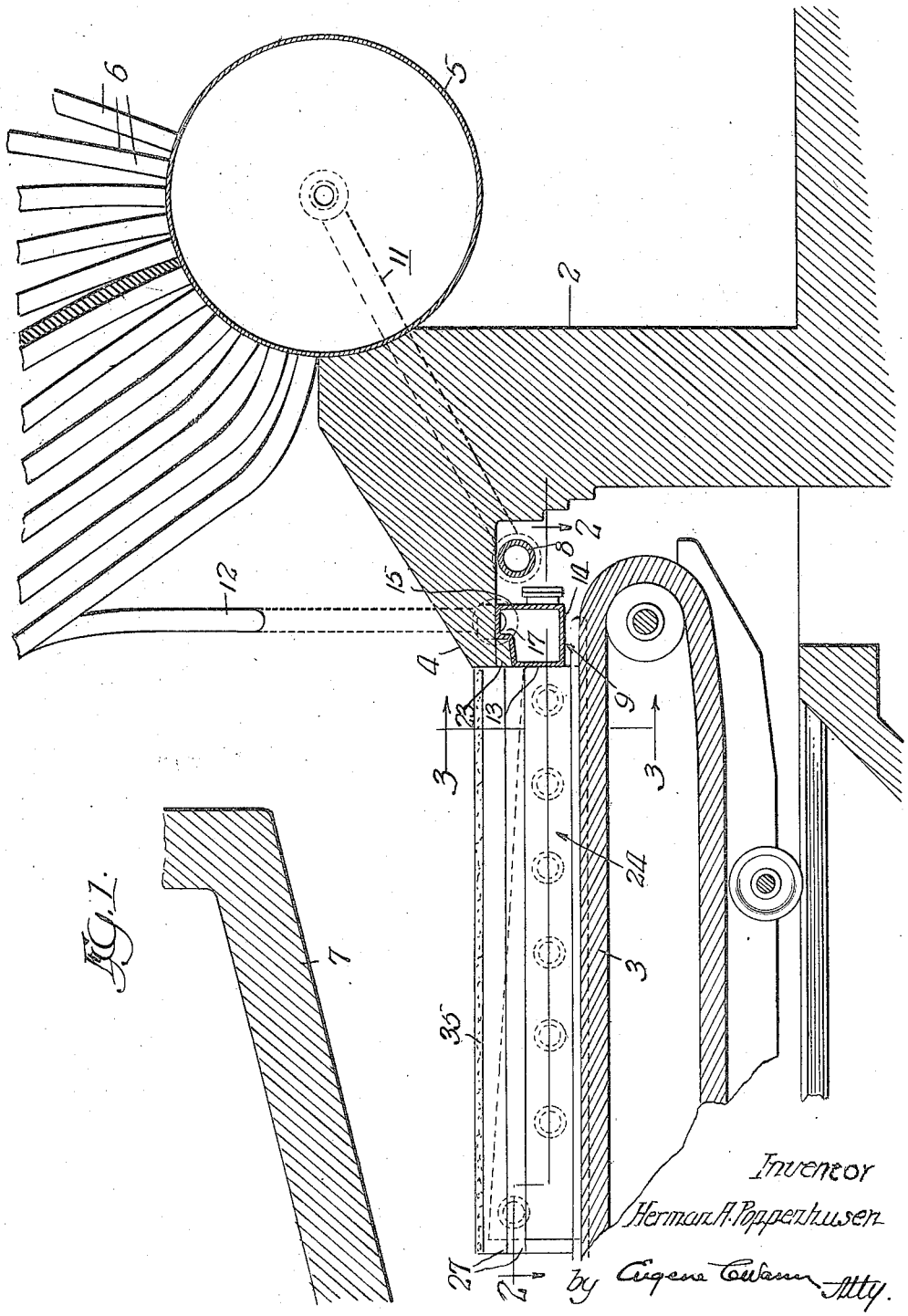

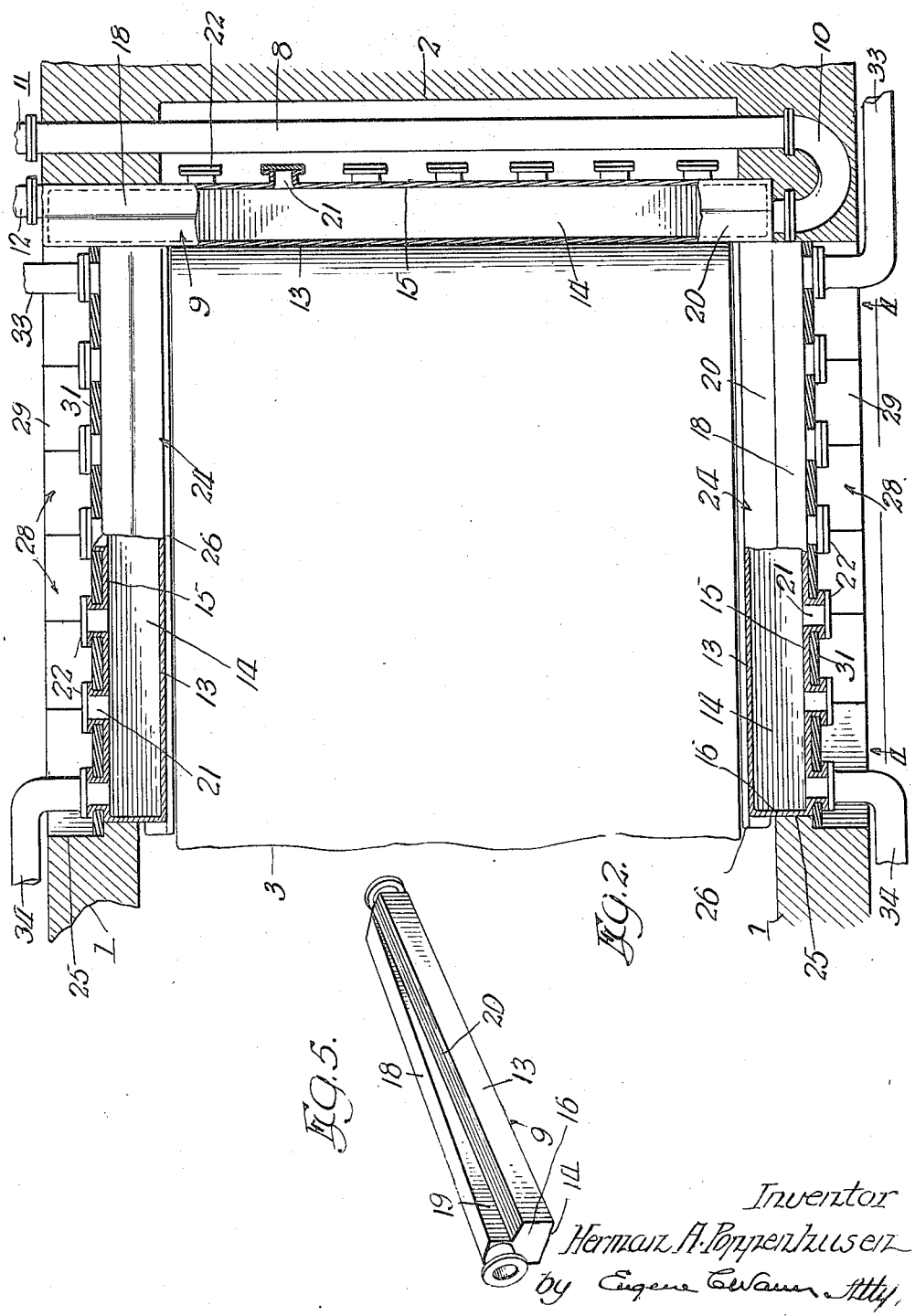

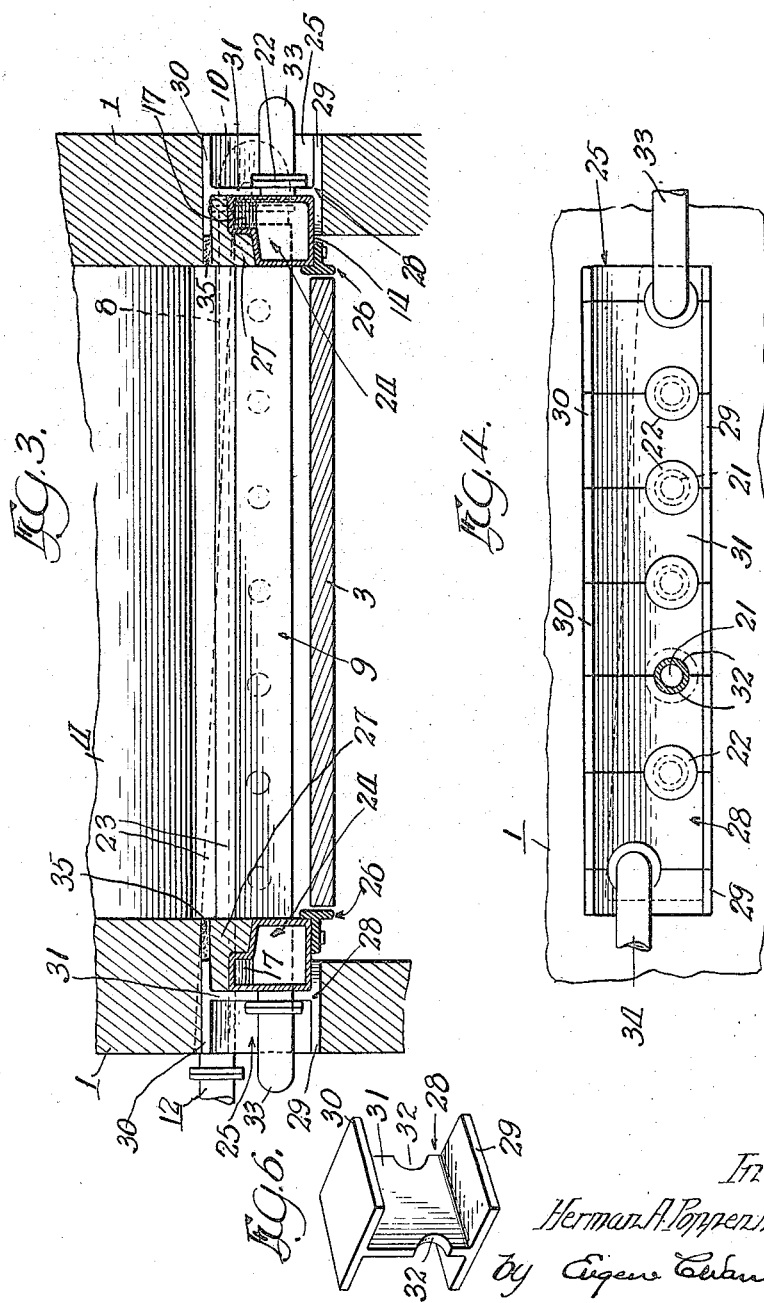

HERMAN A. POPPENHUSEN, OF HAMMOND, INDIANA, ASSIGNOR TO GREEN ENGINEERING COMPANY, OF EAST CHICAGO, INDIANA, A CORPORATION OF ILLINOIS.

LIQUID-COOLED CONDUIT FOR FURNACES.

1,423,540.     Specification of Letters Patent.     Patented July 25, 1922.

Application filed December 22, 1919. Serial No. 346,473.

*To all whom it may concern:*

Be it known that I, HERMAN A. POPPENHUSEN, a citizen of the United States, residing at Hammond, in the county of Lake and State of Indiana, have invented new and useful Improvements in Liquid-Cooled Conduits for Furnaces, of which the following is a specification.

This invention relates to water or liquid cooled conduits for furnaces.

Much difficulty has been experienced in operating steam boiler and other furnaces, by the incandescent ash of the fuel bed adhering to those portions of the furnace walls with which such ash is in contact. This is due to the fact that the wall portion and the ash fuse together when both gain substantially the same degree of heat. It has been proposed heretofore to provide water cooled pipes as the surface against which the incandescent ash contacts, in order to keep such surface at a temperature below that of the hot ash and clinkers, and prevent adhesion by reason of the difference in temperature between such parts, but even this has not fully overcome the objection because the metal pipe or pipes, as the case may be, being constantly exposed to the direct action of the excessive heat, become so hot as to convert the water therein into steam, which cannot be removed rapidly enough to prevent the pipes from becoming as hot as the ash, and the latter adheres thereto and builds thereon by accretion as the result. This is of course detrimental to the furnace structure as well as to its operation. In some types of furnace structures, these pipes have been placed along the side walls directly along the side edges of the grate in order to provide a water cooled surface with which the fuel bed is in contact; and in furnaces of the traveling or chain grate type, additional pipes extend across the grate under the bridge wall overhang to form a water back.

It is among the objects of my invention to overcome the objectionable features noted in connection with water or liquid cooled pipes or conduits so used, and I do so by providing the conduit with a vapor collecting chamber, protected from the direct action of the heat of the incandescent fuel bed so that the vapor may escape from the conduit and thus maintain a sufficient circulation of cooling water through the conduit to maintain the temperature thereof reduced below that of the incandescent fuel bed and prevent adhering and accretion of the incandescent ash on the conduit.

The invention consists further in the matters hereinafter described and more particularly pointed out in the appended claims.

In the accompanying drawings—

Fig. 1 is a longitudinal vertical sectional view taken through a furnace of the endless chain grate type, and showing the water or liquid cooled conduits constructed and applied to the furnace walls in accordance with my invention; there being illustrated such a conduit as a part of the water back and another along each side edge of the grate;

Fig. 2 is a horizontal sectional view taken on line 2—2 of Fig. 1;

Fig. 3 is a transverse vertical sectional view taken on line 3—3 of Fig. 1;

Fig. 4 is an elevational view taken on line 4—4 of Fig. 2;

Fig. 5 is a perspective view of one of said conduits; and

Fig. 6 is a perspective view of a detail of construction to be hereinafter described.

In the drawings, 1, 1 indicates the side walls of the furnace setting, 2 the bridge wall, 3 the endless chain grate, 4 the bridge wall overhang, 5 the mud-drum, 6 the boiler tubes leading from the mud-drum, and 7 the fire arch, all of which are constructed and arranged as illustrated in a furnace of the type shown. The drawings, however, only show enough of the furnace structure to illustrate the manner in which the conduits of my invention are applied thereto.

To illustrate the adaptation of conduits of my invention, I have shown the same as applied to the water back, which extends across the grate 3 adjacent its rear end and beneath the bridge wall overhang 4, and to the side walls 1, 1 along the side edges of the grate. As shown, the water back comprises a rear pipe 8 and a front pipe or conduit 9, the latter embodying the features of my invention, and both extending across the grate between the side walls 1, 1. Said pipe members are connected together at one end of the water back by a U or like fitting 10, and their opposite ends extend through the other side wall 1; the rear pipe 8 being there connected with the mud-drum 5 by a pipe 11, as shown by the dotted lines in Fig. 1, while the front conduit 9 is there connected with the front header of the steam boiler by a pipe 12. The latter, as shown in Fig. 1, extends into the combustion chamber through the side wall 1 to be exposed to the heat in the combustion chamber in the same manner as the boiler tubes, and thus causes an induced circulation of cooling water through the front and rear pipe members of the water back.

The conduit 9, as shown in the drawings, has a front wall 13, against which the incandescent ash moves and compresses, and a bottom wall 14 spaced above the grate 3 to provide the ash discharge passage. The conduit 9 also has a back or rear wall 15 and end walls 16. As shown in the drawings, the conduit 9 is made rectangular in shape, and the front wall 13 is flat and has a uniform height throughout the length of the conduit. The back wall 15 is also flat and at one end of the conduit has a height substantially equal to that of the front wall but increases in height to the opposite end of the conduit so as to form an elongated, tapering steam or vapor collecting chamber 17, having a top wall 18 and a front wall 19, which is located substantially midway between the front and rear walls of the conduit and connected with the front wall 13 by an inclined wall 20. This wall is inclined upwardly toward the chamber 17 so that the vapor bubbles forming in the water in the conduit may readily find access into the free space above the level of the water in the chamber 17, and the latter tapers upwardly toward the discharge end of the conduit, that is, the end opposite the fitting 10, so that the steam or vapor may readily and quickly find its way to the discharge end and thus be removed from the conduit by the pipe 12. This pipe opens into that end of the conduit 9 directly into said chamber 17 for that purpose, and carries off the steam or vapor as rapidly as it may be generated, thereby insuring a sufficient amount of cooling water in the conduit to keep its temperature reduced and prevent the incandescent ash and clinkers from adhering thereto. To permit the conduit 9 to be cleaned easily, the same is provided with a plurality of clean-out holes 21 in the rear wall, as shown in Fig. 2. These holes are normally closed by cover plates 22.

To protect the vapor collecting chamber 17 from the direct heat of the fuel bed and thus maintain that portion of the conduit at the reduced temperature required to gain the result desired, said chamber is shielded from said direct heat by means interposed between the same and the heat. One form of such means is shown in the drawings, and that comprises the building of the bridge wall overhang 4 down in front of the chamber 17, as for instance by inserting a row of fire bricks, such as 23, in front of the wall 19 of such chamber and resting on the top wall 20 of the conduit, as shown in Figs. 1 and 3.

To prevent the incandescent fuel from adhering to the side walls 1, 1 of the furnace setting along the side edges of the grate 3, I provide water or liquid cooled conduits 24, 24, one in each side wall. The conduits 24, 24 are made alike and similar to the conduit 9, and where all have the same features in common the same reference characters are used to indicate similar parts. The primary difference between the two conduits 24 and the one 9 is merely in the location of the conduits. The hottest portion of the fuel bed on the grate 3 is necessarily throughout the rear half of the grate surface, and the conduits 24, 24 need only to extend forward from the water back a little over that distance. To apply the conduits 24, 24 in place, each side wall 1 is provided with an elongated, horizontally arranged opening 25 extending through said side wall and with its bottom in substantially horizontal alignment with the fuel supporting surface of the grate 3. The portion of the side wall 1 below the opening 25 is not as thick as the portion of the side wall above the opening, and when the conduit 24 is in place, its bottom wall 14 projects into the combustion chamber in substantially horizontal alignment with the fuel supporting surface of the grate 3, as shown in Fig. 3. To prevent the upward passage of air between the conduit 24 and the adjacent side edge of the grate 3, there is a ledge plate flange 26 secured to the bottom wall of the conduit, as shown. The conduit 24 has a height to extend above the grate a distance greater than the thickness of the fuel bed on the grate, and has its vapor collecting chamber 17 protected from the direct action of the heat of the fuel bed by an interposed row of fire bricks 27 forming a part of the side wall 1 above the conduit, as shown in Fig. 3.

To support the conduit 24 in place and also to prevent the passage of air into the combustion chamber through the opening 25, the following construction is provided. Placed in the opening 25 against the back wall of the conduit 24, are a plurality of plates 28, 28, abutting edgewise and each having a base flange 29 resting on the bottom of the opening 25 and extending beneath the bottom wall 14 of the conduit, as shown in Fig. 3. Each plate also has a top flange 30 bearing upward against the top of the opening 25 and extending part way into the side wall 1. The plates are shaped like I-beams, as shown in Fig. 6, and they abut endwise when assembled in place. The conduit 24 is also provided with a plurality of clean-out holes 21, normally closed by cover plates 22. The upright web 31 of the plates 28 are provided in their side edges with cut-out portions 32 to receive the blind pipe extensions to which the cover plates are secured. The end of the conduit 24 adjacent the conduit 9 may be termed the rear end of the same, and to that end is connected a pipe 33, which leads to the mud-drum or rear header, as the case may be, for supplying cooling water to the conduit. The opposite end of the conduit is the outlet end thereof, and the vapor collecting chamber 17 has its greatest height at that end. A pipe 34 is connected with the conduit at that end and leads to the front header or equivalent part to induce a circulation of cooling water through the conduit, as in the case of the conduit 9. The upright webs 31 of the two plates 28 at the front end of the conduit 24 have their cutaway portions 32 adjacent the top of the webs to permit the connection for the pipe 34 to extend through such webs. This is shown in Fig. 4. The space formed by the upper flanges 30 and the upper row of fire bricks 27 is filled by a layer or strip of ganister or like cementing material 35. As the chambers 17 taper from practically zero at one end of the conduit to the greatest height at the opposite end of the conduit, at least two horizontal rows of bricks (23, 27) will be needed to provide a complete protection for said chambers, as shown in the drawings.

By the construction described, it is obvious that all the conduits 9 and 24 serve the same purpose, and by each being provided with a vapor collecting chamber 17 the steam or vapor that may be generated in the conduit, due to the radiation of heat from the incandescent fuel bed moving against the conduit, will be quickly and rapidly collected and carried off into the circulating system of the boiler as rapidly as formed and thus prevent the entire body of water in the conduit from being generated into steam and thus maintain the temperature of the conduit reduced to that required for preventing any part of the incandescent fuel bed from adhering to the conduit and building on the same by accretion in the operation of the furnace.

While I have shown and described herein conduits embodying the features of my invention and placed in the particular locations mentioned, yet it is to be of course understood that the conduits may be used in other locations where required to accomplish the objects desired, and, furthermore, I do not wish to be confined to the exact details of construction and particular location of parts, as such may be variously modified and changed without departing from the spirit and scope of my invention.

I claim as my invention:

1. In a furnace, the combination with a combustion chamber and a grate therein, of a water-cooled conduit associated with one of the walls of said combustion chamber and having inlet and outlet openings, said conduit lying in direct contact with the fuel bed on the grate and having an enlarged portion projecting outward from the body portion of the conduit and forming a vapor collecting chamber in communication with said outlet, and means associated with said wall and extending in front of said enlarged portion to shield the same from the direct heat of the fuel bed.

2. In a furnace, the combination with a combustion chamber and a grate therein, of a tubular water-cooled conduit associated with one of the walls of said combustion chamber and having inlet and outlet openings, said conduit having one of its side faces lying in direct contact with the fuel bed on the grate and having an enlarged portion projecting upward from the body portion of the conduit and forming a vapor collecting chamber in communication with said outlet, and means associated with said wall and extending in front of said enlarged portion to shield the same from the direct heat of the fuel bed.

3. In a furnace, the combination with a combustion chamber and a grate therein, of a tubular water-cooled conduit associated with one of the walls of the combustion chamber and having inlet and outlet openings, said conduit lying in direct contact with the fuel bed on the grate and having an enlarged portion projecting outward from the body portion of said conduit and tapering from one end of the conduit to the other, said enlarged portion forming a vapor collecting chamber in communication with said outlet, and means associated with said wall and extending in front of said enlarged tapered portion to shield the same from the direct heat of the fuel bed.

4. In a furnace the combination with a combustion chamber and a grate therein, of a tubular water-cooled conduit associated with one of the walls of the combustion chamber and having inlet and outlet openings, said conduit having one of its side faces lying in direct contact with the fuel bed on the grate and having in its top wall an enlarged portion forming a vapor collecting chamber in communication with said outlet, said enlarged portion being offset rearwardly with respect to the exposed side face of said conduit, and means associated with said wall and extending in front of said enlarged portion to shield the same from the direct heat of the fuel bed.

5. In a furnace, the combination with the bridge wall overhang and a traveling grate extending beneath the same, of a water back extending across the grate between the same and the bridge wall overhang and having a rear pipe and a front conduit connected together at one end of the water back, said conduit being in the path of movement of the incandescent fuel bed carried by the grate toward the rear end thereof; said conduit having in its top wall an upwardly projecting enlarged portion extending lengthwise of the conduit and providing a vapor collecting chamber in communication with the outlet end of said conduit, said enlarged portion being offset rearwardly with respect to the exposed face of said conduit, and means associated with said bridge wall overhang and extending in front of said enlarged portion to shield the same from the direct heat of the fuel bed on said grate.

6. In a furnace, the combination with the bridge wall overhang and a traveling grate extending beneath the same, of a water back extending across the grate between the same and said bridge wall overhang, and comprising a rear pipe and a front conduit connected together at one end of the water back, said conduit being in the path of movement of the fuel bed carried by the grate toward the rear end thereof, said conduit having in its top wall an enlarged portion projecting above said wall and forming a vapor collecting chamber extending lengthwise of said conduit, said enlarged portion being tapered from one end of said conduit to the other and communicating at one end with the outlet of said conduit, said enlarged portion being offset rearwardly with respect to the exposed face of said conduit and said bridge wall overhang having a portion thereof extending downward in front of said enlarged portion for shielding the same from the direct heat of the fuel bed on said grate.

7. In a furnace structure, a wall exposed to the heat produced in the furnace and having an elongated opening extending therethrough, a fluid carrying conduit inserted in said opening and having a fluid inlet at one end and a fluid outlet at the other end, said conduit being provided with a vapor collecting chamber along the top thereof and increasing in height from the inlet to the outlet end of the conduit and opening into the latter, said wall having a portion extended down in front of said chamber to protect the same from the direct action of the heat produced in the furnace, and means for supporting and maintaining said conduit in said opening, comprising a plurality of sectional plates abutting edge to edge and having upper and lower flanges bearing against the top and bottom, respectively, of said opening.

8. In a furnace, the combination with a combustion chamber and a grate therein, of a tubular water cooled conduit associated with one of the side walls of said combustion chamber and having inlet and outlet openings, said conduit lying in direct contact with the fuel bed on the grate and having an enlarged portion forming a vapor collecting chamber in communication with said outlet, means associated with said wall and extending in front of said enlarged portion to shield the same from the direct heat of the fuel bed, and means substantially aligned with said conduit and permitting access to the same from the exterior of said wall.

9. In a furnace, the combination with a combustion chamber and a grate therein, of a tubular water cooled conduit associated with one of the side walls of said combustion chamber and having inlet and outlet openings, said conduit having its front side wall in direct contact with the fuel bed on the grate and having in its top wall an enlarged portion forming a vapor collecting chamber in communication with said outlet, said conduit having a clean-out opening in its rear side wall, said furnace wall being provided with an opening aligned with said clean-out opening to permit access to be had into said conduit from the exterior of said furnace wall, and means associated with said furnace wall and extending in front of said enlarged portion to shield the same from the direct heat of the fuel bed.

10. In a furnace, the combination with a combustion chamber and a grate therein, of a tubular water cooled conduit associated with one of the side walls of said combustion chamber and having inlet and outlet openings, said conduit having its front side wall in direct contact with the fuel bed on the grate and having in its top wall an enlarged portion forming a vapor collecting chamber in communication with said outlet, said conduit having a plurality of cleanout openings in its rear side wall and spaced apart endwise of said conduit, said furnace wall being provided with an elongated opening aligned with said clean-out openings to permit access to be had into said conduit from the exterior of said furnace wall, and means associated with said furnace wall and extending in front of said enlarged portion to shield the same from the direct heat of the fuel bed.

In testimony that I claim the foregoing as my invention, I affix my signature, this 19th day of December, A. D. 1919.

HERMAN A. POPPENHUSEN.